United States Patent [19]

Takahashi et al.

[11] Patent Number: 4,933,831
[45] Date of Patent: Jun. 12, 1990

[54] POWER SUPPLY

[75] Inventors: Isao Takahashi, 463, Kitayama-cho, Nagaoka-shi, Niigata; Masataka Mitani, Kyoto; Minoru Maehara, Kadoma, all of Japan

[73] Assignees: Isao Takahashi, Niigata; Matsushita Electric Works Ltd., Osaka, both of Japan

[21] Appl. No.: 407,093

[22] Filed: Sep. 14, 1989

[30] Foreign Application Priority Data

Sep. 19, 1988 [JP] Japan .................................. 63-235982
Oct. 11, 1988 [JP] Japan .................................. 63-256568

[51] Int. Cl.$^5$ ............................................ H02M 3/335
[52] U.S. Cl. ....................................... 363/132; 363/17; 363/124; 363/37
[58] Field of Search ................. 363/16, 17, 37, 44–48, 363/98, 124, 126, 132

[56]  References Cited

U.S. PATENT DOCUMENTS

| | | | |
|---|---|---|---|
| 4,340,931 | 7/1982 | Endo et al. | 363/124 |
| 4,412,277 | 10/1983 | Mitchell | 363/124 |
| 4,525,774 | 6/1985 | Kino et al. | 363/17 |
| 4,706,180 | 11/1987 | Wills | 363/132 |
| 4,809,310 | 2/1989 | Salesses et al. | 363/98 |

*Primary Examiner*—Peter S. Wong
*Attorney, Agent, or Firm*—Armstrong, Nikaido, Marmelstein, Kubovcik & Murray

[57]  ABSTRACT

An inverter power supply with improved power factor comprises a source of low frequency AC voltage and an inverter having a pair of series connected first and second transistors controlled to alternately turn on and off at a high frequency for providing a high frequency AC voltage to a load. A diode-bridge full-wave rectifier is connected to provide a DC voltage which is charged to at least one capacitor which in turn provides a DC voltage input to the inverter. An inductor, which counteracts the capative reactance of the capacitor for improving the power factor, is inserted in series with the AC voltage source across the input of the diode-bridge rectifier. The first and second transistors of the inverter also operate to interrupt or chop at the high frequency a current fed through the inductor from the AC voltage source so as to charge the capacitor through the rectifier by the inductor. During each one cycle of the AC voltage from the AC voltage source, the first and second transistors are both serve to chop the current through the inductor for charging the capacitor as well as to provide the current to the load. Further, the rectifier shares at least two diodes of the inverter for establishing a loop for charging the capacitor.

9 Claims, 8 Drawing Sheets

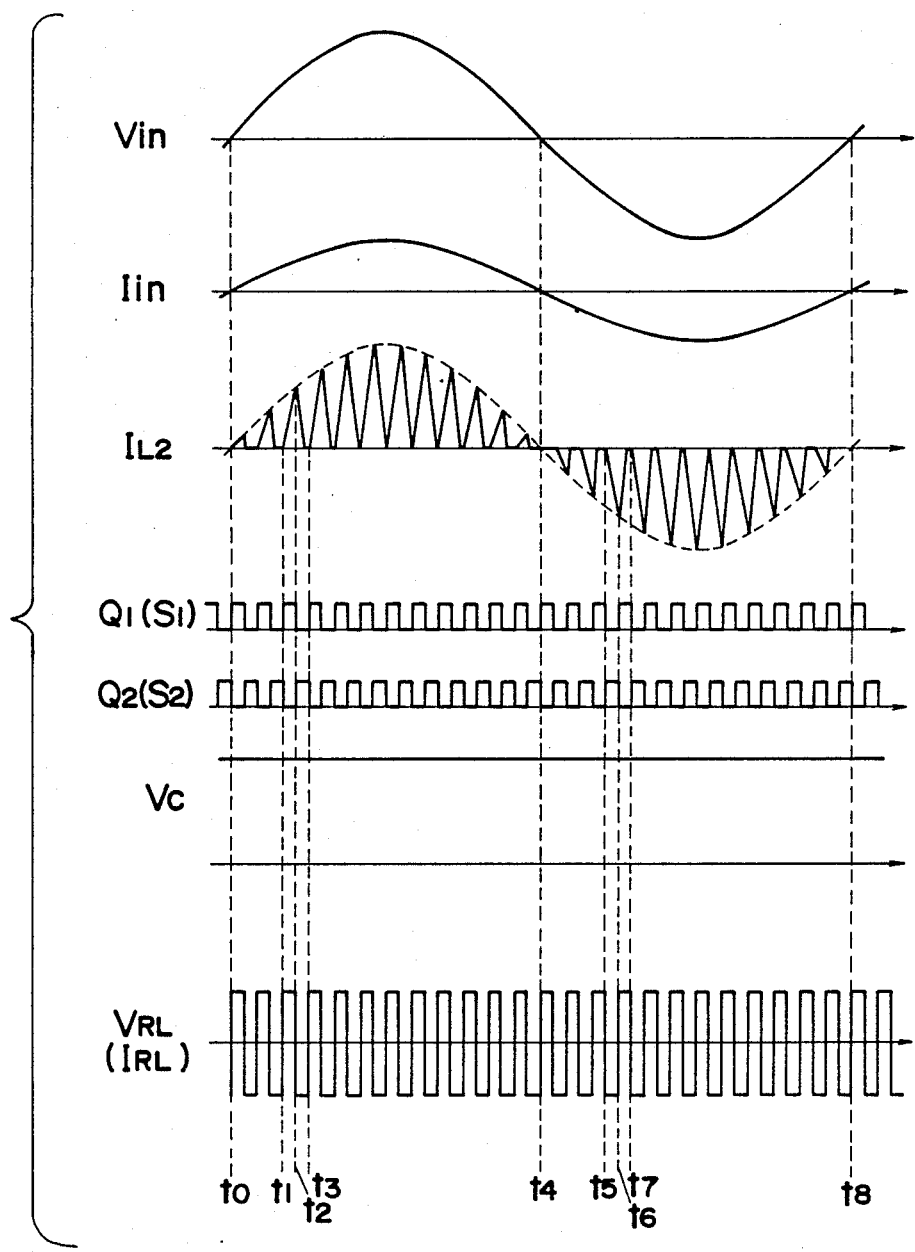

POWER SUPPLY

BACKGROUND OF THE INVENTION

1. The Field of the Invention

The present invention is directed to a power supply, and more particularly to an inverter AC power supply providing a high frequency AC voltage to a load with an improved power factor.

2. Description of the Prior Art

In an inverter AC power supply for use to drive such as discharge lamps and electric motors, it is required to smooth an input voltage applied to the inverter by the use of a capacitor. It is known that the capacitor acts as a reactive load with a high capative reactance and therefore reduces a power factor. To eliminate the adverse effect of the capacitor, an inductor or choke coil may be coupled with the capacitor to reduce the capative reactance of the capacitor. However, due to the fact that a source voltage for the inverter is normally a commercial line voltage of a relatively low frequency, the inductor or choke coil is limited to have a high inductance for such low frequency and therefore bulky, which unduly increases the size of the power supply and therefore should be avoided for compact design of the power source. To this end, it has been proposed to chop the voltage applied to the inverter input at a high frequency to thereby permit the use of a choke coil of less inductance and size. However, such chopping operation requires an additional switching circuit to the inverter circuit and therefore adds complexity to the overall power supply circuit with considerable duplication of components. For simplifying the circuit and reducing the number of components, U.S. Pat. No. 4,564,897 proposes to use common component both to the inverter and chopper operations. Unfortunately, the patent is found unsatisfactory as the common components are limited to only one of plural switching elements and there are still a greater number of other components required separately for the inverter and chopper operations. Therefore, it is most desirous to share not only one switching element but also the other components as many as possible for further reducing the number of duplicated components and therefore the size and cost of the power supply.

SUMMARY OF THE INVENTION

To eliminate the above problem and deficiency, the present invention discloses an improved inverter power supply of unique circuit configuration. The power supply comprises a source of low frequency AC voltage, a rectifier providing a DC voltage from the AC voltage source, capacitor means receiving the DC voltage output of the rectifier, and an inverter operating to switch the DC voltage output from the capacitor means at a high frequency to provide a high frequency AC voltage to a load. The inverter comprises a pair of series connected first and second switching elements which are controlled to alternately turn on and off at the high frequency the input voltage from the capacitor means. First and second diodes are connected in an anti-parallel relation respectively to the first and second switching elements. The first and second switching elements defines therebetween a first point of connection. The rectifier is in the form of a diode bridge comprising, in addition to the first and second diodes, a series pair of third and fourth diodes connected across in anti-parallel relation to the series pair of the first and second switching elements. The third and fourth diodes defines therebetween a second point of connection. An inductor is connected in series with the AC voltage source between the first and second points of connection such that the AC voltage is fed through the inductor to the diode-bridge rectifier. The first and second switching elements of the inverter are cooperative to also define a chopper which operates to repeat interrupting the AC voltage from the AC voltage source to develop at the inductor a resulting voltage which is then rectified through the full-wave rectifier for providing the DC voltage to the capacitor means such that the inverter operates to switch the DC voltage from the capacitor means for providing the high frequency AC voltage to the load.

With this circuit arrangement, the alternate switching on and off of the first and second switching elements produces within each half cycle of the AC voltage a first chopper mode alternated by a second chopper mode while effecting an inverter operation of providing the high frequency AC voltage to the load. The first chopper mode is a pre-charge condition in which one of the first and second switching elements is conductive to establish a closed loop of the AC voltage source, the inductor, one of the third and fourth diodes, and the one switching element for storing the energy in the inductor. The second chopper mode is a charge condition in which the one switching element is non-conductive to establish a closed loop of the inductor, the one of the third and fourth diodes, the capacitor, one of the first and second diodes, and the AC voltage source for releasing the energy from the inductor to charge the capacitor means. In this manner, these modes or conditions repeat within each half cycle of the AC voltage of the AC voltage source to effect charging the capacitor which provides the smoothed input voltage to the inverter. Thus, the first and second switching elements of the inverter can be best utilized equally within each one complete cycle of the input AC voltage as effecting the chopper operation for providing the DC voltage to the capacitor means. In this sense, both of the first and second switching elements can be utilized common to the inverter and chopper operations to reduce the number cf the switching elements to a minimum. Further with the above circuit arrangement, the full-wave rectifier can make the most of the first and second diodes, which are necessary as flyback diodes in the chopper operation and which are normally required for protection of the switching elements in the inverter operation, to form a diode bridge only with the addition of the third and fourth diodes, thus reducing the number of diodes required in the circuit to a minimum.

Accordingly, it is a primary object of the present invention to provide a power supply which is capable of improving the power factor by incorporating the inductor coupled with the capacitor and reducing the size of the inductor by chopping the voltage applied thereto, yet greatly reducing the number of duplicate components with an attendant reduction in power loss.

In a preferred version of the present invention, the capacitor means comprises a pair of first and second capacitors connected in series across the first and second switching elements with each of the first and second capacitors is connected in series with the load across each of the first and second capacitors to form a half-bridge configuration with the first and second switching elements and the load. Accordingly, the first and second capacitors are cooperative respectively with the first and second switching elements to effect the inverter operation of applying the high frequency AC voltage to the load.

It is therefore another object of the present invention to provide a power supply which includes an inverter of half-bridge configuration and which is capable of improving the power factor with a minimum number of components.

In another version, the capacitor means comprises a first capacitor connected across the pair of the first and second switching elements. A second capacitor is added in the circuit which is connected in series with the load across one of the first and second switching elements and which is connected in series with the load and the first capacitor across the other switching element. The one switching element acts to switch the DC voltage from the second capacitor to flow a current through the load, while the other switching element acts to switch the DC voltage which is the voltage of the first capacitor minus that of the second capacitor to flow an opposite current through the load. This version can also effect the same inverter operation.

In a further version of the present invention, the first and switching elements are each made of a MOSFET including a parasitic diode which is utilized to define each of the first and second diodes. By better utilization of such characteristic of MOSFET, no separate first and second diodes are necessary to further reduce the number of components, which is therefore a further object of the present invention.

Alternatively, the first and second switching elements are each formed by a bipolar transistor having a base-emitter path bypassed by a conductive element. The bipolar transistor has a base-collector P-N junction which is cooperative with the bypassing conductor element to define each of the first and second diodes which are anti-parallel with the bipolar transistor. This alternative arrangement makes the use of P-N junction of the bipolar transistor as forming the first and second diodes and to withstand the most of the voltage applied across the transistor. Thus, when, for example, an additional diode is utilized as the bypassing conductive element, such additional diode may be of relatively low voltage withstanding capability and therefore of less expensive, making it possible to realize the circuit without incurring additional cost but rather reducing the cost.

The present invention discloses still other advantageous features particularly for use with polyphase AC voltage source.

These and still other objects and advantages will become more apparent from the following description of the embodiments of the present invention when taking in conjunction with the attached drawings.

BRIEF DESCRIPTION OF THE DRAWINGS

FIG. 2 is waveform chart illustrating waveforms at several points in the above circuit;

DESCRIPTION OF THE PREFERRED EMBODIMENTS

First embodiment <FIGS. 1 to 4>

Figure 1:
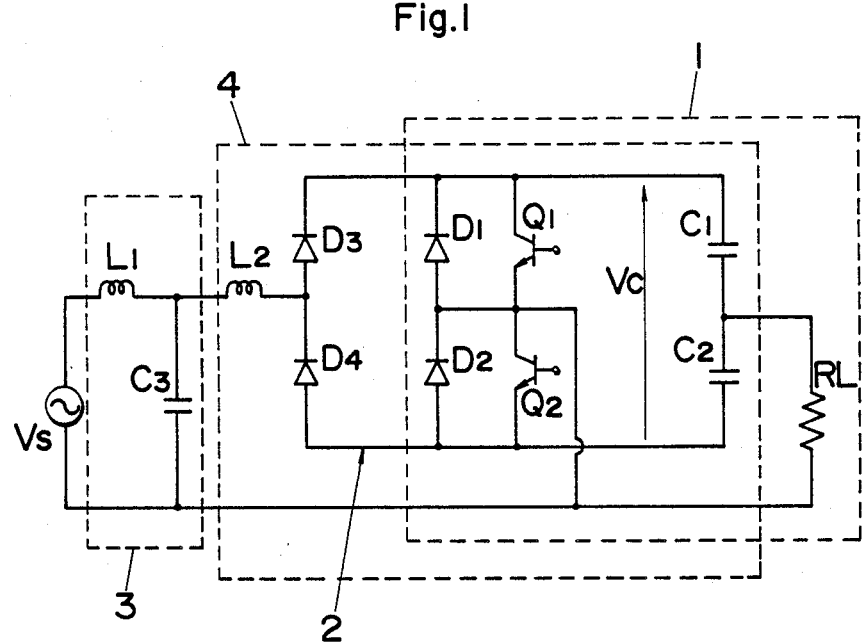
FIG. 1 is a circuit diagram of a power supply in accordance with a first embodiment of the present invention.

Referring now to FIG. 1, there is shown a power supply in accordance with a first embodiment of the present invention. The power supply comprises an inverter 1 providing a high frequency AC voltage to a load which may include inductive reactance or capative reactance. For example, the power supply may be utilized to drive electric motors, discharge lamps, or may construct switching regulators. In the following description and drawings, the load is expressed as a resistive load RL for simplicity.

The inverter 1 comprises a pair of first and second switching elements or bipolar transistors Q1 and Q2, and a pair of first and second capacitors C1 and C2 which are connected in a half-bridge configuration with the load RL. First and second transistors Q1 and Q2 are controlled, as shown by respective control signals S1 and S2 in FIG. 2, to alternately turn on and off at a high frequency for switching the DC voltage developed across each of first and second capacitors C1 and C2 to provide a high frequency AC voltage, as shown by VRL in FIG. 2, to the load RL. First and second diodes D1 and D2 are connected in anti-parallel relation respectively to transistor Q1 and Q2. The inverter 1 is supplied with a DC voltage from a full-wave rectifier 2 connected to a low frequency AC voltage source VS which is normally a commercial AC voltage of 50 or 60 Hz. Connected between the AC voltage source Vs and the rectifier 2 is a low pass filter 3 composed of an inductor L1 and a capacitor C3. The rectifier 2 is a diode bridge which comprises, in addition to first and second diodes D1 and D2, third and fourth diodes D3 and D4. The output of the rectifier 2 is supplied to the inverter 1 as being smoothed by capacitor C1 and C2 so as to provide a smoothed DC voltage to the inverter input.

An inductor L2 is inserted in series with the AC voltage source VS across the rectifier input so as to counteract the capative reactance of capacitors C1 and C2 for improving the power factor. The inductor L2 is cooperative with first and second switching transistors Q1 and Q2 to provide an interrupted AC current IL2, as shown in FIG. 2, which is rectified through the rectifier 2 and is supplied to charge capacitors C1 and C2 as being smoothed thereat. The above operation may be referred to as a chopper operation in contrast to the inverter operation in which first and second switching transistors Q1 and Q2 operate to switch the DC voltage of each of first and second capacitors C1 and C2 for providing the high frequency AC voltage to the load RL.

In FIG. 1, the components effecting the above chopper operation are enclosed by a dotted block 4 which may be termed as a chopper circuit in contrast to the inverter circuit denoted by the dotted block 1. From FIG. 1, it can be readily understood that the chopper circuit 4 and the inverter circuit 1 shares a large number of components and further that the inverter circuit 1 shares first and second diodes D1 and D2 with the rectifier 2. Thus, the power supply circuit of the present invention can be constructed with a minimum number of components.

Figure 3A:
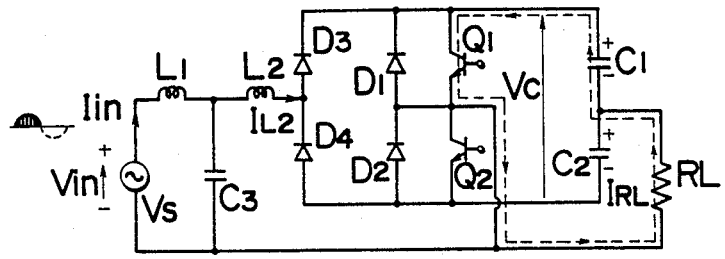
FIGS. 3A to 3D are respectively diagrams illustrating current flows in the operation of the circuit during a positive half cycle of an input AC voltage.
Figure 3B:
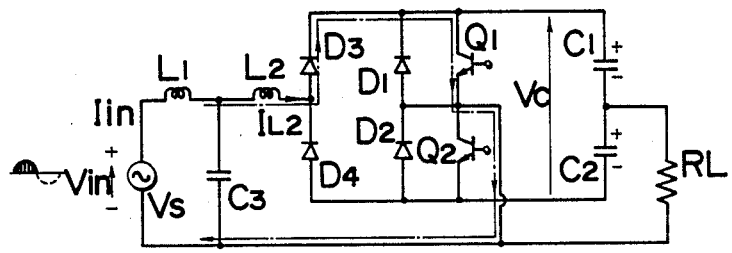
Figure 3C:
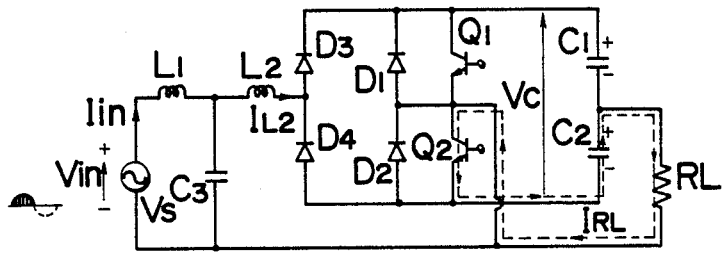
Figure 3D:
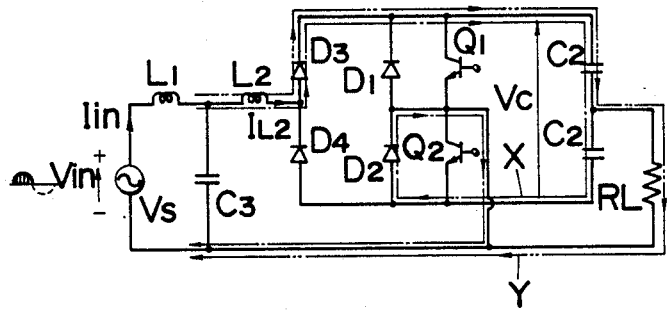

The above chopper and inverter operations will be explained in detail with reference to FIGS. 2 to 4. During a positive half cycle of the AC voltage Vin from AC voltage source Vs, first and second switching transistors Q1 and Q2 are made alternately conductive and non-conductive to repeat producing an inverter-alone [first chopper] mode alternated by an inverter-and-charge [second chopper] mode. The inverter-alone [first chopper] mode is a condition occurring in a time period, for example, between t1 and t2 of FIG. 2, in which condition first transistor Q1 is conductive to establish a loop from the capacitor C1, transistor Q1, and load RL to flow a current IRL from capacitor C1 through load RL in the direction by a dotted arrow in FIG. 3A. Also in this condition, another closed loop is formed to flow a current IL2 in the direction, as shown in FIG. 3B, from AC voltage source Vs through inductor L1, inductor L2, third diode D3, transistor Q1, and back to AC voltage source Vs, thereby storing an energy into inductor L2. As shown in FIG. 2, the current IL2 is increasing up to a level corresponding to an instantaneous AC voltage.

Subsequently, when first transistor Q1 becomes non-conductive and second transistor Q2 is instead made conductive, the circuit comes into the inverter-charge [second chopper] mode which is a condition occurring in a time period of t2–t3 of FIG. 2. In this condition, a loop is formed to include second transistor Q2, second capacitor C2, and load RL to flow from second capacitor C2 a current IRL of opposite direction through the load RL, as indicated by a dotted arrow in FIG. 3C. Also in this condition, another loop is formed to release the energy of inductor L2 through third diode D3, first and second capacitors C1 and C2, second diode D2, and AC voltage source vs, as shown by an arrow X of FIG. 3D, to charge first and second capacitors C1 and C2. At the same time, an additional loop is formed to flow a current from the inductor L2 through third diode D3, first capacitor C1, load RL, and AC voltage source VS, as indicated by an arrow Y in the same figure. In this manner, during the positive half cycle of the AC voltage source VS, first transistor Q1 serves both for the chopper operation of charging capacitors C1 and C2 and also for the inverter operation of providing the current IRL to the load RL, while second transistor Q2 serves only for the inverter operation.

Figure 4A:
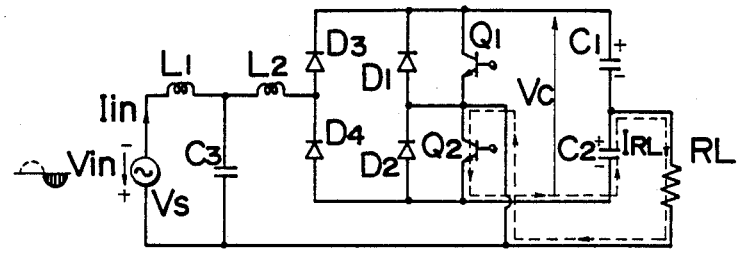
FIGS. 4A to 4D are respectively diagrams illustrating current flows in the operation of the circuit during a negative half cycle of the input AC voltage.
Figure 4B:
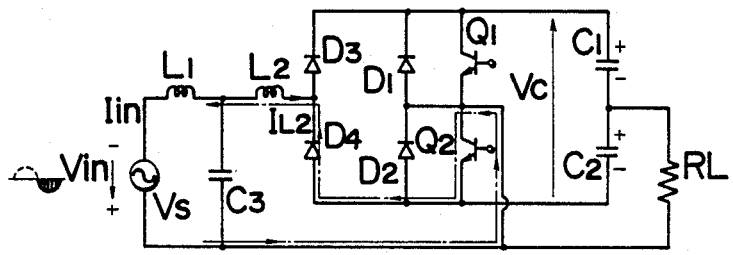
Figure 4C:
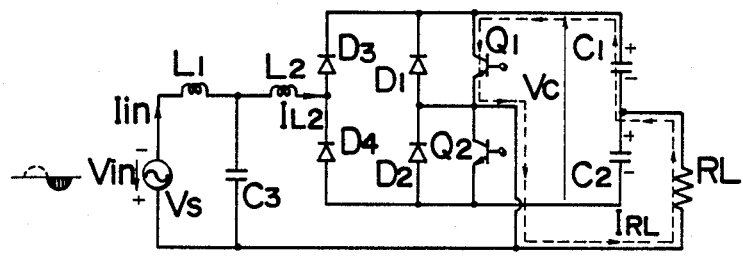
Figure 4D:
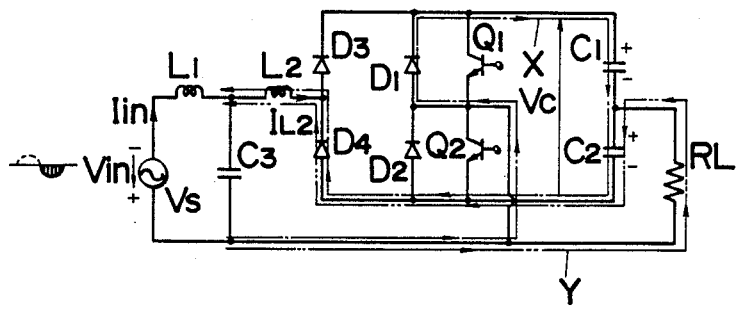

During a negative half cycle of the AC voltage source VS, the above two modes are likewise repeated. For instance, when second transistor Q2 is made conductive in a time period of t5–t6 in FIG. 2, the circuit comes into the inverter-alone [first chopper] mode in which capacitor C2 provides a current IRL to the load RL through second transistor Q2, as shown in FIG. 4A. At the same time, AC voltage source vs supplies a current IL2 through the second transistor Q2, fourth diode D4, inductor L2 in the direction as indicated by an arrow in FIG. 4B, to store the energy in the inductor L2. Likewise in the positive half cycle, the current IL2 is increasing to a level corresponding to an instantaneous voltage of the AC voltage source VS. Upon subsequent non-conduction of second transistor Q2 and conduction of first transistor Q1 indicated by a time period of t6— t7, the circuit comes into the inverter-and-charge [second chopper] mode in which first transistor Q1 acts to flow the current IRL from first capacitor C1 to the load RL in the direction as indicated by an arrow in FIG. 4C to effect the inverter operation. At the same time, the energy stored in the inductor L2 is released through AC voltage source VS, first diode D1, first and second capacitors C1 and C2, and fourth diode D4, as indicated by an arrow X in FIG. 4D, to charge first and second capacitors C1 and C2. Also at this occurrence, inductor L2 causes a current to circulate though AC voltage source vs, load RL, second capacitor C2, fourth diode D4, and back to the inductor L2, as indicated by an arrow Y in the same figure. In this manner, the circuit operates in the negative half cycle of the AC voltage to likewise repeat the chopper and inverter operations, wherein first transistor Q1 serves only for the inverter operation, but instead second transistor Q2 serves both for the inverter and chopper operations.

In this manner, first and second transistors Q1 and Q2 are equally utilized in one complete cycle of the AC voltage for the chopper operation and therefore share stress uniformly, whereby presenting a well balanced transistor configuration and enabling to use the transistor of the same characteristics for first and second transistors Q1 and Q2. It is noted at this time that, as shown in FIG. 2, the current IL2 passing through inductor L2 shows a sinusoidal envelop which is consistent with improving the power factor. It should be also noted that first and second diodes D1 and D2 serve to form the loops respectively in the positive and negative half cycles for charging both the first and second capacitors C1 and C2 in such a manner as to provide a smoothed DC voltage to the inverter input. Whereby, the inverter can successfully produce a high frequency AC load current with reduced ripples. By the provision of the low pass filter 3 between the voltage source VS and the inductor L2, an input current Iin to the power supply circuit can be free from being influenced by the high frequency switching operation of the transistors and therefore can retain a continuous wave form to thereby reduce distortion factor.

Figure 5:
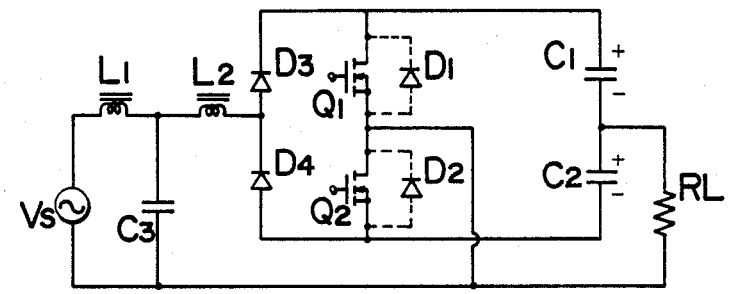
FIG. 5 is a circuit diagram illustrating a modification of the circuit of FIG. 1.

FIG. 5 shows a modification of the first embodiment which differs from the first embodiment only in that MOSFET (Metal Oxide Semiconductor Field Effect Transistor) is utilized as first and second switching transistors Q1 and Q2. The modification utilizes a parasitic diode intrinsic to the MOSFET as defining first and second diode D1 and D2, thus further reducing the number of components or diodes. The operation and the other configuration are identical to the first embodiment. Therefore, like numerals are used to designate like components for an easy reference purpose.

Figure 6:
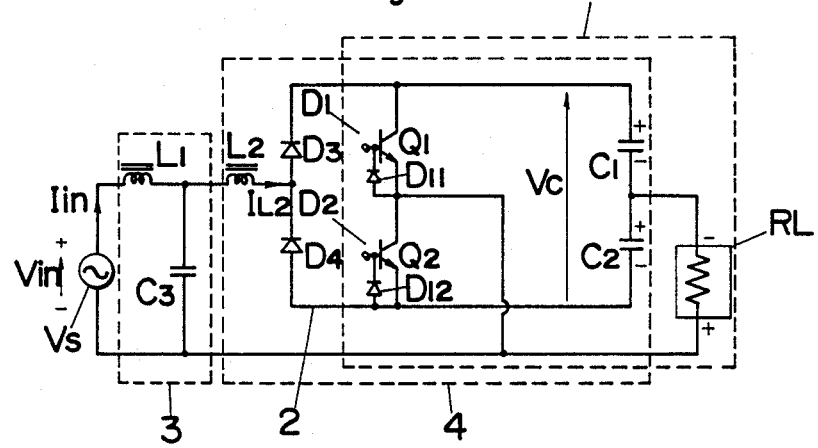
FIG. 6 is a circuit diagram illustrating a second modification of the circuit of FIG. 1.

FIG. 6 shows another modification of the first embodiment in which first and second switching elements Q1 and Q2 are each of bipolar transistor having a base-emitter path bypassed by each of diodes D11 and D12.

Diodes D11 and D12 are connected in anti-parallel relation respectively to first and second switching transistors Q1 and Q2. Each of diodes D11 and D12 is cooperative with a base-collector P-N junction of corresponding transistor to define each of the first and second diodes D1 and D2 which allows the reverse current flow across first and second switching transistors Q1 and Q2. In this modification, the base-collector P-N junction can withstand most of the voltage applied across the transistor so that the additional diodes D11 and D12 may be of low voltage withstanding capability and therefore of less expensive. Thus, the modification makes the use of a base-collector P-N junction of the bipolar transistor to form the reverse current flow path only with the addition of the diodes D11 and D12 of low cost economy. Since the additional diodes D11 and D12 are utilized as conductive elements to bypass the base-emitter path of the transistor, they may be replaced by suitable impedance elements. The operation and other configuration are identical to those of the first embodiment and therefore like numerals are employed to designate like components. It is noted at this point that the first and second switching elements may be alternatively power MOSFET, SI(static induced) thyristor, or GTO (gate turn off) thyristor having the like junction capable of forming the first and second diodes.

Figure 7:
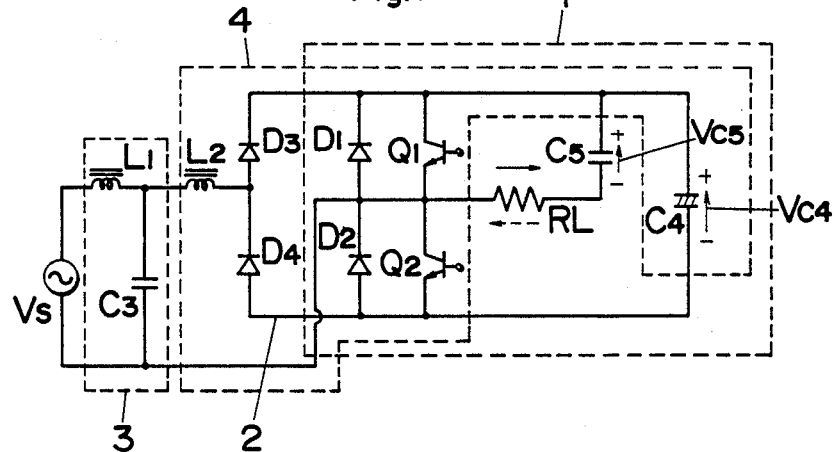
FIG. 7 is a circuit diagram of a power supply in accordance with a second embodiment of the present invention.

Second embodiment <FIG. 7>

Referring to FIG. 7, there is illustrated a power supply in accordance with a second embodiment of the present invention, which is similar in configuration to the first embodiment except for particular capacitor location in the inverter. Like numerals are employed like components as in the first embodiment for an easy reference purpose. In this embodiment, first capacitor C4 is connected across the series pair of first and second transistors Q1 and Q2, while second capacitor C5 is connected in series with a load RL across the first transistor Q1.

In operation, when the first transistor Q1 becomes conductive while the second transistor Q2 is non-conductive during a positive half cycle of the AC voltage from voltage source VS, the voltage source VS flows a current of increasing magnitude through inductor L2, third diode D3, first transistor Q4 and back to the voltage source V5 to store energy into the inductor L2. At the same time, first transistor Q1 also acts to flow a current from second capacitor C5 through the load RL as indicated by a solid arrow in FIG. 7. Subsequently, when first transistor Q1 becomes non-conductive and in stead second transistor Q2 becomes conductive within the same cycle, the inductor L2 release its energy through third diode D3, first capacitor C4, diode D2, and Voltage source VS to charge first capacitor C4, thereby accumulating a smoothed DC voltage into first capacitor C4. At this occurrence, another current is caused to flow from inductor L2 through third diode D3, second capacitor C5, load RL, and voltage source VS. Simultaneously, second transistor Q2 operates to flow a current from first capacitor C4 through second capacitor C5, load RL, and second transistor Q2 in the direction indicated by a dotted arrow in FIG. 7. Thus, load RL receives a voltage which is a voltage VC4 accumulated in first capacitor C4 minus a voltage VC5 in second capacitor C5.

During a negative half cycle of the AC voltage from AC voltage source VS, when first transistor Q1 becomes non-conductive and in stead second transistor Q2 becomes conductive, voltage source VS supplies a current through second transistor Q2, fourth diode D4, inductor L2, and back to voltage source VS to store energy into inductor L2. At this occurrence, second transistor Q2 operates to flow a current from first capacitor C4, second capacitor C5, load RL, second transistor Q2, and back to first capacitor C4 to provide the load current as indicate by the dotted arrow. As stated previously, the voltage applied to load RL is the difference (VC4−VC5) between voltage VC1 of first capacitor C4 and voltage VC5 of second capacitor C5. Upon subsequent occurrence in which first and second transistors Q1 and Q2 becomes respectively conductive and non-conductive, inductor L2 releases its energy through AC voltage source VS, first diode D1, first capacitor C4, and fourth diode D4 to charge first capacitor C4, thereby accumulating a smoothed DC voltage in first capacitor C4. Also at this occurrence, first transistor Q1 operates to flow a current from capacitor C5 to load as indicated by the solid arrow in FIG. 7, applying the voltage Vcs of second capacitor C5 to load RL. In this manner, first and second switching transistors Q1 and Q2 repeat alternately conductive and non-conductive for effecting the inverter operation of applying a high frequency AC voltage to load RL while at the same time effecting the chopper operation of charging capacitors C4 and C5 through inductor L2 and diode-bridge rectifier of D1 to D4 in such a way as to provide the smoothed voltage to the inverter input. In this embodiment, the capacitance of second capacitor C5 is selected such that the voltage VC5 accumulated in second capacitor C5 is half the voltage VC4 of first capacitor C4 [VC5=½VC4] for providing a symmetrical high frequency AC voltage or current to load RL, as shown in FIG. 2.

Figure 8:
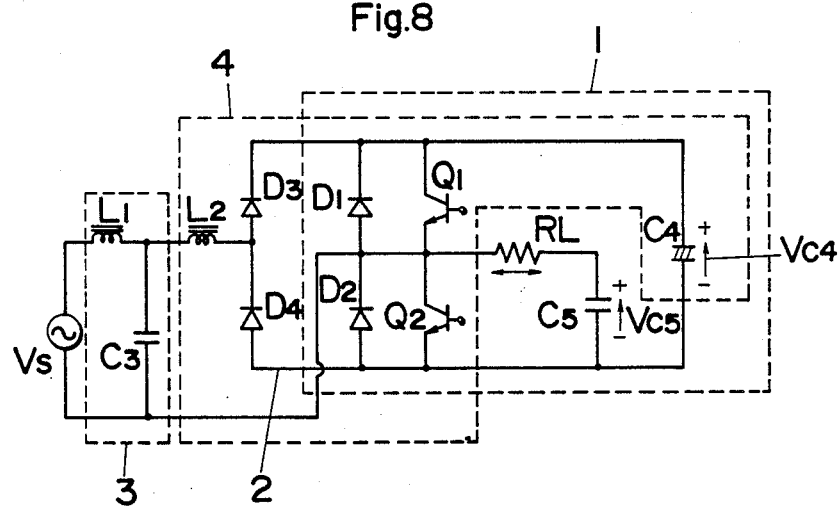
FIG. 8 is a circuit diagram of a modification of the circuit of FIG. 7.

FIG. 8 illustrate a modification of the second embodiment which is similar in configuration to the second embodiment except that second capacitor C5 is connected in series with load RL across second transistor Q2. The operation of the modification is identical to the second embodiment and is deemed unnecessary. Like components are designated by like numerals as in the second embodiment. It should be noted at this time that the second embodiment and the modification thereof may also utilize a MOSFET for each of first and second switching transistors Q1 and Q2, as discussed in the modification of the first embodiment with reference to FIG. 5, or further may adopt the like switching element as discussed in the other modification of the first embodiment with reference to FIG. 6.

Figure 9:
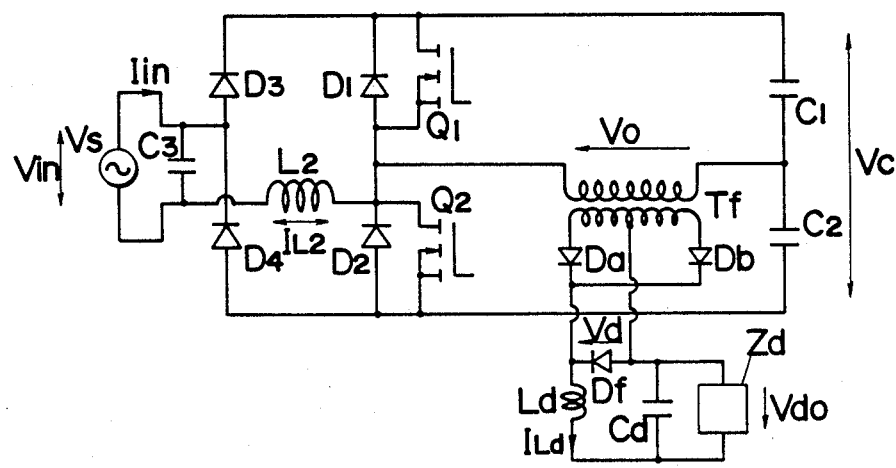
FIG. 9 is a circuit diagram of a switching regulator which is one application form of the present invention.
Figure 10:
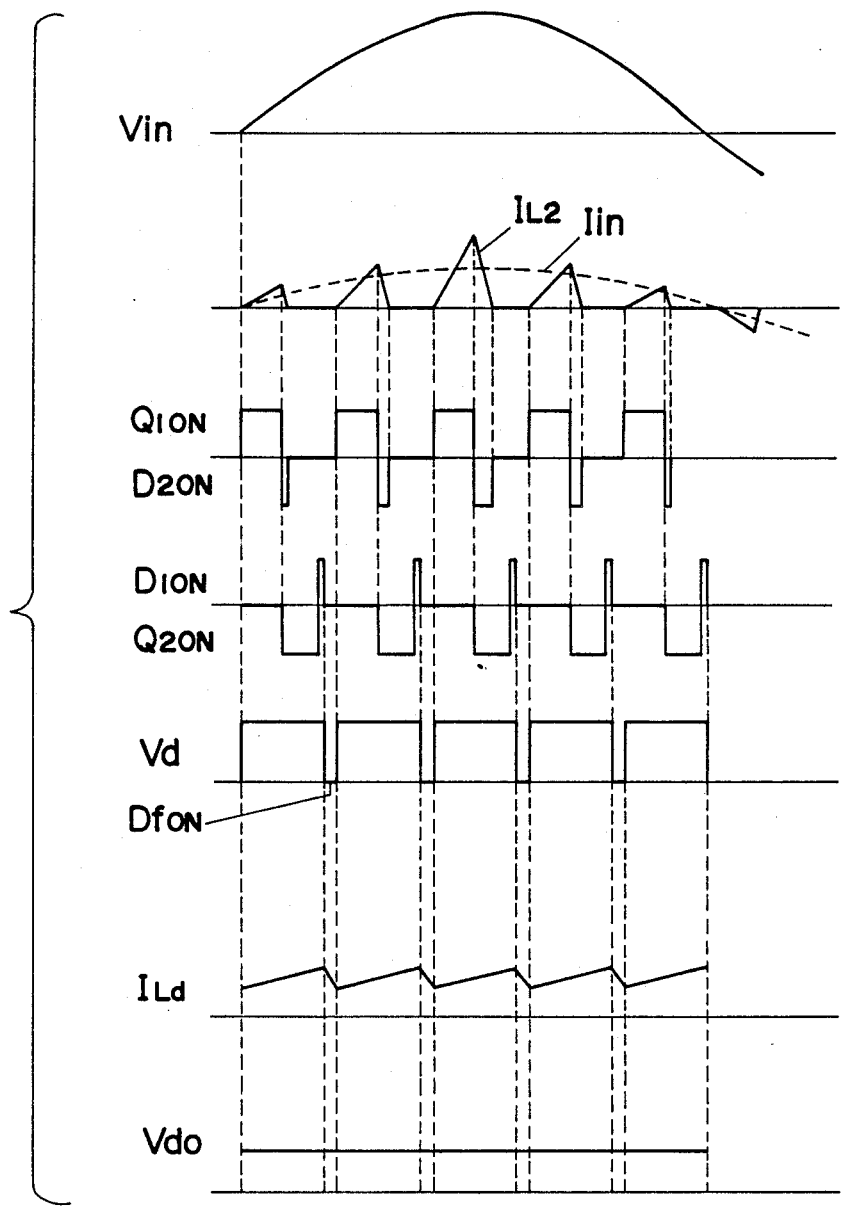
FIG. 10 is a waveform chart illustrating waveforms at several point in the circuit of FIG. 9.

FIG. 9 illustrates a switching regulator which is one application form of the present invention. The basic circuit configuration is identical to the first embodiment of FIG. 1, and therefore like components are designated by like numerals. In the circuit, an output transformer Tf has its primary winding connected to the output of the inverter and has its secondary winding connected to a DC load Zd through several components. First and second switching transistors (FETs) Q1 and Q2 are controlled to alternately turn on and off with an all-off period therebetween in which they are simultaneously off. Such all-off period can be realized by varying the on-period or duty ratio with respect to each of the switching transistors Q1 and Q2. When either of transistors Q1 or Q2 is on, the circuit provides a rectangular output pulse to DC load Zd. When, on the other hand, both of transistors Q1 and Q2 are off, the circuit provide a zero inverter output voltage V0 during which period, a feedback diode Df is conductive to provide a zero output voltage Vd to a DC output circuit including DC load Zd. Thus, the circuit can effect voltage control over the DC load Zd by using a PWM technique. FIG. 10 shows waveforms at several points of the circuit. As seen in FIG. 10, when transistor Q1 is on within the positive cycle of the source voltage Vin, a current IL2 through inductor L2 will increases linearly to a level corresponding to source voltage Vin. Upon subsequent turning off of transistor Q1, second diode D2 is conductive to apply a voltage (Vin−Vc) to inductor L2. Since the voltage (Vin−Vv) is negative, the current IL2 through inductor L2 will be reduced. When current IL2 is decreased to zero, second diode D2 will be no longer conductive. At this occurrence, however, due to the presence of an inductor Ld in the DC output circuit, a diode Df becomes conductive to provide to DC load Zd a resulting voltage Vd having a waveform as seen in FIG. 10. Therefore, by suitably adjusting the time period in which transistors Q1 and Q2 are both made non-conductive, it is possible to control the mean value of the voltage Vd and in turn the DC voltage Vd0 applied to DC load Zd. The above technique can be equally utilized to control an AC load.

Figure 11:
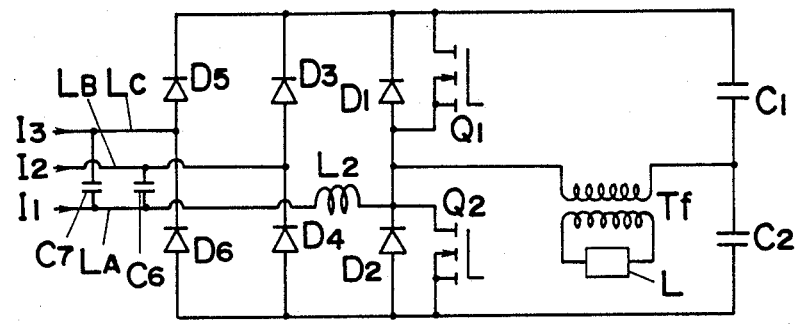
FIG. 11 is a circuit diagram of a power supply for use with a polyphase AC voltage source in accordance with a third embodiment of the present invention.

Third embodiment <FIG. 11>

Referring to FIGS. 11, there is shown a power supply in accordance with a third embodiment of the present invention. The power supply of this embodiment is to be operated by a three-phase AC voltage source for driving a load of greater power requirement. In the figure, a load L is connected to the inverter output through an output transformer Tf. The circuit is identical to that of the first embodiment except for a rectifier configuration. Like numerals designate like components as in the first embodiment for an easy reference purpose. An additional pair of series connected fifth and sixth diodes D5 and D6 is connected in parallel with the series pair of third and fourth diodes D3 and D4. The three phase voltage source (not shown) is coupled to a rectifier composed of diodes D5 to D6 with a first phase line LA connected through inductor L2 to the point of connection between first and second switching transistors Q1 and Q2 (i.e. between first and second diodes D1 and D2), with a second phase line LB connected to the point of connection between third and fourth diodes D3 and D4, and with a third phase line LC connected to a point of connection between fifth and sixth diodes D5 and D6. Filter capacitors C5 and C7 are respectively inserted between first and second phase lines LA and LB and between first and third phase lines LA and LC. In this circuit, the additional pair of diodes D5 and D6 and inductor L2 are cooperative with first and second diodes D1 and D2 and with first and second transistors Q1 and Q2 to form an identical circuit configuration to the first embodiment, thereby effecting the same chopper operation of charging capacitors C1 and C2. Thus, the third phase line LC connected between diodes D5 and D6 sees a like sinusoidal current I3 as obtained in the first embodiment. Likewise, the second phase line LB sees a sinusoidal current I2 also because that diodes D1 to D4, inductor L2, and transistors Q1 and Q2 form an identical circuit configuration to the first embodiment. With this result, first phase line LA sees a like sinusoidal current I1 from the known relation that I1+I2+I3=0. Therefore, it is confirmed that the power supply of the circuit retains an improved power factor.

Figure 12:
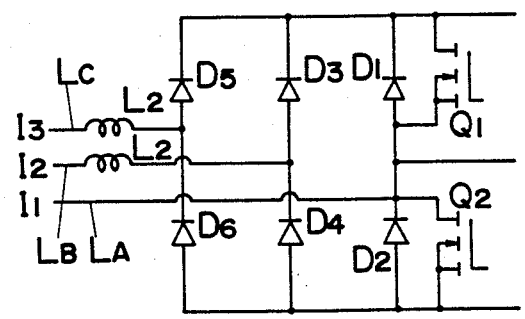
FIGS. 12 and 13 are circuit diagrams respectively illustrating modifications of the third embodiment.
Figure 13:
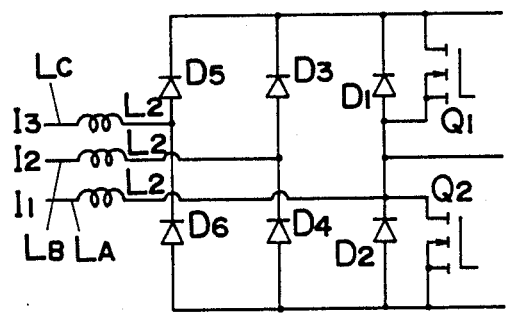

FIGS. 12 and 13 show modifications of the third embodiment which differs in the number of inductors L2 inserted between the three phase AC voltage source and the diode rectifier. The other configuration is identical to the third embodiment and therefore like numerals are employed to designate like components. These modifications are based upon the requirement that first, second, or third phase line LA, LB, LC could never see a short-circuit current when either of transistor Q1 or Q2 is turned on. Therefore, as seen in the above third embodiment, only one inductor L2 is enough when inserted in the first phase line LA. Also, as seen in the modification of FIG. 12, inductors L2 are required to be inserted respectively in second and third phase lines LB and LC. Alternatively, as seen in the modification of FIG. 13, inductors L2 are required to be inserted respectively in all of first, second, and third phase lines LA, LB, and LC. In the circuit of FIGS. 11 and 12, it is difficult to obtain balanced three phase sinusoidal waveforms for the input currents to the circuit due to the fact that current I1 is not identical to current I2 or I3. However, with the circuit of FIG. 13, it is easily possible to obtain such balanced three phase sinusoidal waveforms by suitably selecting the inductance of the three inductors L2. Although in the circuits of FIGS. 11 to 13, MOS transistor is utilized as first and second transistors Q1 and Q2, it is of course possible to utilize bipolar transistor, MOSFET with a parasitic diode, SI(static induced) thyristor, or GTO (gate turn off) thyristor, as discussed in the previous embodiments and modifications. Further, it is also possible to modify the present embodiment into the arrangements disclosed in FIGS. 6, 7, and 8.

It should be noted that the diodes utilized in the above modifications and modifications to form the full-wave rectifier can be replaced by a corresponding element or device having a unidirectional current path such as a reverse conducting SCR (silicon-controlled rectifier), and that the term "diode means" are utilized in the claims simply as representative of diode and such equivalent element or device. Therefore, the terms "diode means" should not be understood to be limited in a narrow sense to the diode itself and to refer generally to such unidirectional element or device.

What is claimed is:

1. A power supply comprising:
    a source of low frequency AC voltage;
    an inverter comprising a pair of series connected first and second switching elements which are controlled to alternately turn on and off at a high frequency for switching an input DC voltage to provide a high frequency AC voltage to a load, said first and second switching elements being connected in an anti-parallel relation respectively with first and second diodes, said first and second switching elements defining therebetween a first point of connection;
    a full-wave rectifier providing a DC voltage from said AC voltage source, said rectifier being a bridge circuit comprising said series pair of said first and second diode means and another pair of series connected third and fourth diode means in parallel with said series pair of said first and second diode means, said third and fourth diode means defining therebetween a second point of connection;
    capacitor means supplied with a DC voltage through said full-wave rectifier from said AC voltage source to provide a DC voltage to said inverter input;

inductor means connected in series with said AC voltage source between said first and second points of connection;

said first and second switching elements of said inverter defining a chopper which operates to repeat interrupting an AC voltage from said AC voltage source so as to develop at said inductor means a resulting voltage and allow the resulting voltage to be fed through said full-waver rectifier for providing said DC voltage to said capacitor means.

2. A power supply comprising:

a source of low frequency AC n phase voltage;

an inverter comprising a pair of series connected first and second switching elements which are controlled to alternately turn on and off at a high frequency for switching an input DC voltage to provide a high frequency AC voltage to a load, said first and second switching elements being connected in anti-parallel relation respectively with first and second diode means, said first and second switching elements defining therebetween a first point of connection;

a full-wave rectifier providing a DC voltage from said n phase AC voltage source, said rectifier comprising a pair of said first and second diodes means and n−1 pairs of third and fourth diode means connected in series across said pair of said first and second switching elements with their forward direction opposite to that of said first and second switching elements, said third and fourth diodes means in each pair defining therebetween a second point of connection;

said n phase AC voltage source connected to said first point of connection through a first phase line, and to said second points of connection in said n−1 pairs of said third and fourth diode means respectively through a second phase line to a n-th phase line;

capacitor means supplied with a DC voltage through said full-wave rectifier from said AC voltage source to provide a DC voltage to said inverter input;

inductor means inserted in at least one of said first to n-th phase lines such that said inductor means is connected in series with said n phase AC voltage source between said first point of connection and said second point of connection in each of said n−1 pairs of said third and fourth diode means;

said first and second switching elements of said inverter defining a chopper which operates to repeat interrupting an AC voltage from said n phase AC voltage source so as to develop at said inductor means a resulting voltage and allow said resulting voltage to be fed through said full-waver rectifier for providing said DC voltage to said capacitor means.

3. A power supply as set forth in claim 1 or 2, wherein said capacitor means comprises a pair of first and second capacitors connected in series across said first and second switching elements with each of said first and second capacitors connected in series with said load across each of said first and second capacitors.

4. A power supply as set forth in claim 1 or 2, wherein said capacitor means comprises a first capacitor connected across said pair of first and second switching elements and further including a second capacitor which is connected in series with said load across one of said first and second switching elements.

5. A power supply as set forth in claim 1 or 2, wherein said load comprises a rectifying-and-smoothing circuit and a DC load.

6. A power supply as set forth in claim 1 or 2, wherein at least one of said first and second switching elements is controlled to vary its on-time period.

7. A power supply as set forth in claim 1 or 2, wherein each of said first and second switching elements is a MOSFET including a parasitic diode which defines each of said first and second diode means.

8. A power supply as set forth in claim 1 or 2, wherein each of said first and second switching elements is a bipolar transistor having a base-emitter path bypassed by a conductive element, said bipolar transistor having a base-collector P-N junction which is cooperative with said bypassing conductive element to define each of said first and second diode means anti-parallel with the bipolar transistor.

9. A power supply as set forth in claim 8, wherein said conductive element is a diode.

* * * * *